F. B. DE KERAVENAN.
Lamp.
No. 30,466.
Patented Oct. 23, 1860.
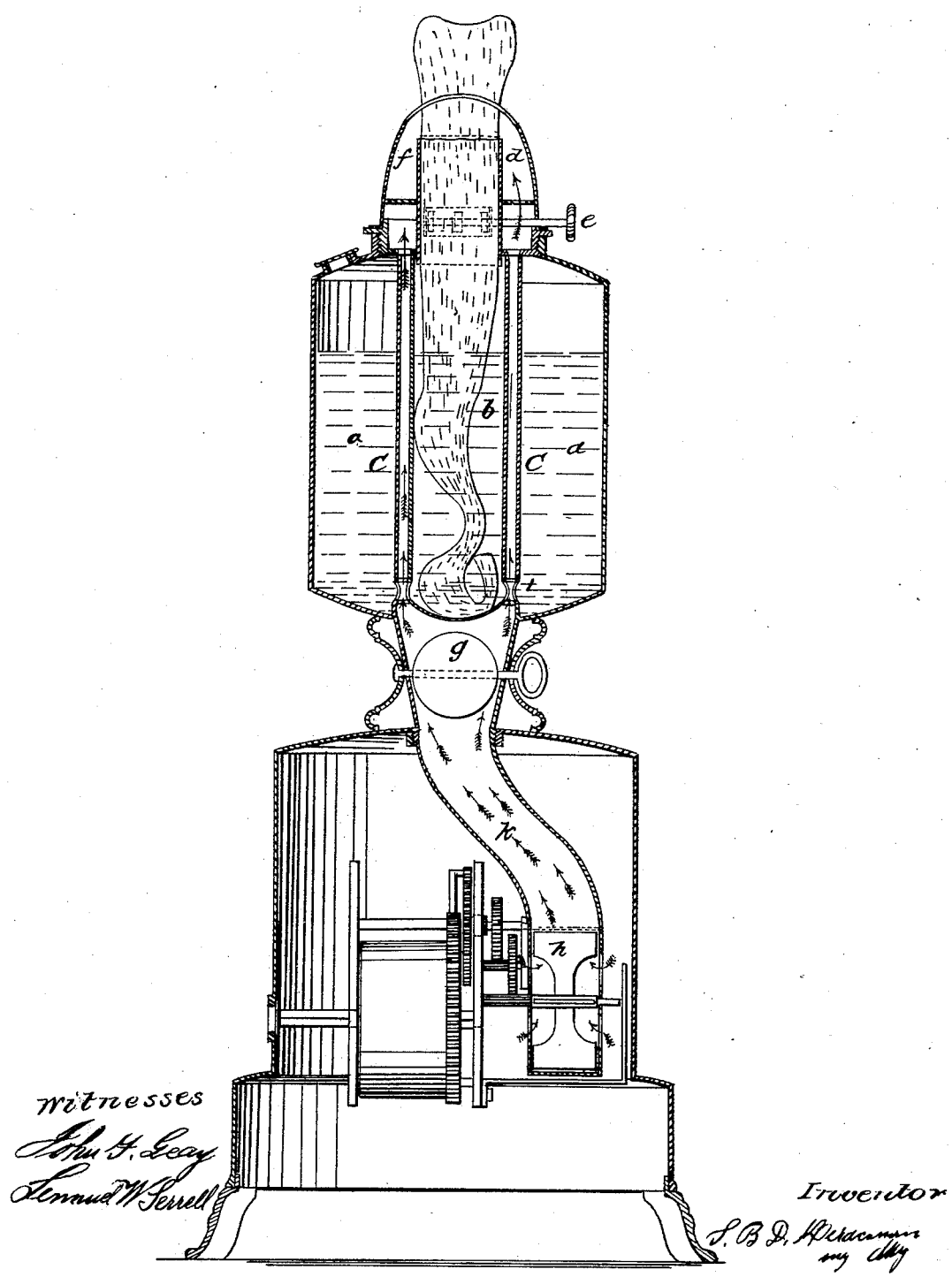

UNITED STATES PATENT OFFICE.

FRANCIS B. DE KERAVENAN, OF NEW YORK, N. Y.

LAMP.

Specification of Letters Patent No. 30,466, dated October 23, 1860.

*To all whom it may concern:*

Be it known that I, FRANCIS BERNARD DE KERAVENAN, of the city, county, and State of New York, have invented, made, and applied to use a certain new and useful Improvement in Lamps; and I do hereby declare that the following is a full, clear, and exact description of the nature of my said invention, reference being had to the annexed drawing, making part of this specification, wherein I have represented a lamp vertically in section to show my said invention.

In lamps for burning kerosene, rosin oil, whale oil, &c., in which an excess of carbon exists, it has been usual heretofore to apply a glass shade or chimney of a size and height to draw in at the base of the flame, a sufficient amount of atmospheric air to combine with the carbon and prevent smoke; or else different forms of deflectors or buttons have been applied to cause the naturally ascending draft (from the heat) to impinge or be brought in contact with the flame to consume the carbon. In these previous instances serious difficulties arise. With the chimney there is risk of breakage, and often in country places, where lamps are mostly used, this injury is not easily repaired; besides this the lamps with chimneys are not adapted to general portable use, and moving them through the air causes smoke. The same may be said of all devices depending upon the natural levity of heated air for the draft to the lamp, because in all instances the draft to the flame is induced by rarefaction and levity producing an ascending column of air.

The nature of my said invention consists in the application to the flame of a lamp of an impelled current of air driven by suitable mechanism, and striking the flame at or near the base in such a manner that the carbon is entirely consumed, and said current of air being independent of the flame itself is not affected by changing position or moving the lamp from place to place.

In the drawing $a$, is a reservoir of oil or fluid adapted to burning purposes. 1, 1, are pipes communicating therefrom to the wick tube $b$, within the air tube $c$.

$d$, is the burner of any ordinary or desired construction.

$e$, is the wick raiser.

$f$ is a cone or deflector of the desired and appropriate shape.

$g$ is a damper or valve by which the supply of air is regulated.

$h$, represents a fan blower driven by a suitable spring and train of wheels; but it will be evident that the air may be impelled through the tube $k$, to the flame of the lamp by a blower or other mechanism propelled by a spring or otherwise.

The air passing or being forced under compression comes in contact with the flame in such a manner as to consume all the carbon, making a beautiful clear steady flame, without smoke, and without a chimney, and the lamp can be carried about or subjected to drafts of air or wind without smoking. The amount of air supplied must in all cases be according to the material being burned and the height of the wick.

I do not claim air forced by mechanical means into a fire or flame, as the same is coeval with metallurgy, furnaces, &c., but

What I claim and desire to secure by Letters Patent is—

A lamp supplied with an impelled current of air from a suitable blowing apparatus, effecting the new and useful results specified.

Dated September 12th 1860.

F. B. DE KERAVENAN.

Witnesses:
JOHN F. GRAY,
LEMUEL W. SERRELL.